Figure 6:
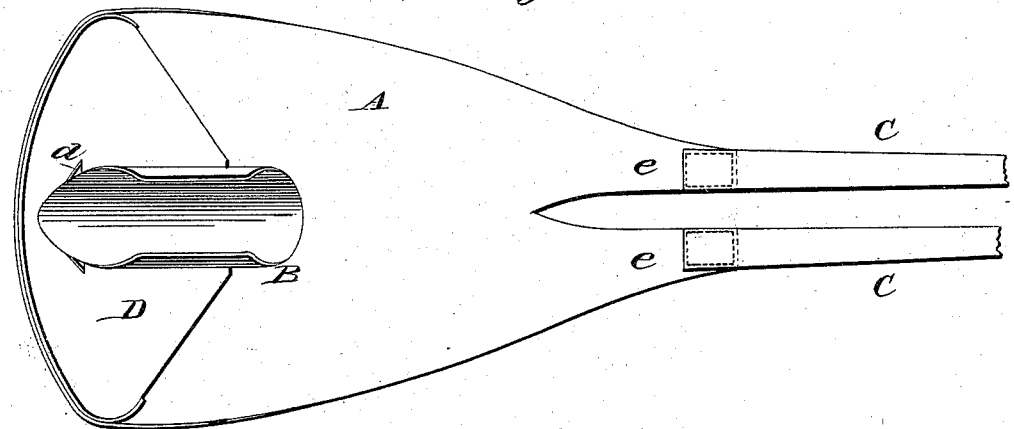

(No Model.) 2 Sheets—Sheet 1.
W. G. BRISTOW.
CHILD'S SEAT FOR BICYCLES.
No. 558,010. Patented Apr. 7, 1896.
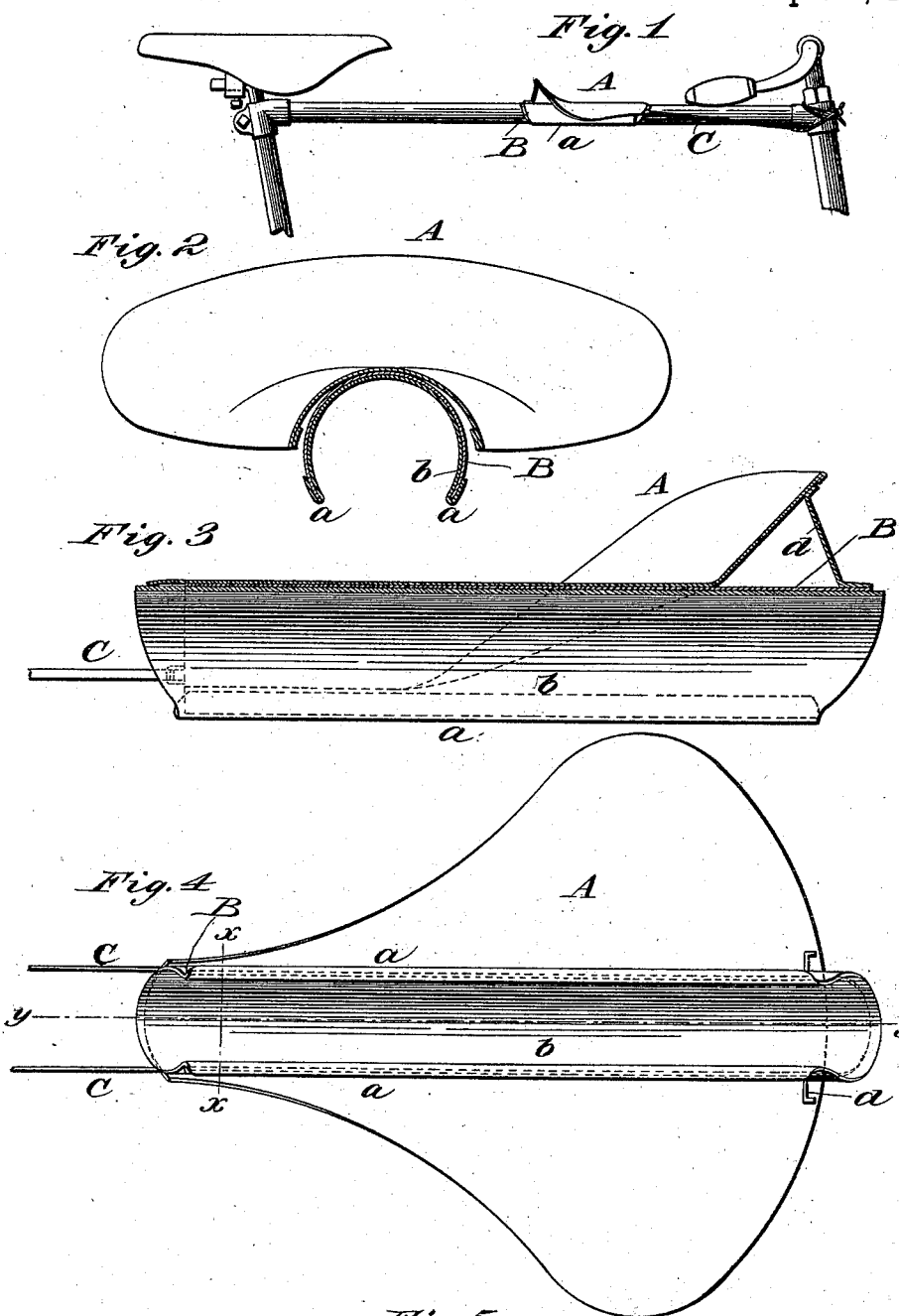
Witnesses:
J. F. Coleman
Noble D. Larner
Inventor
William George Bristow
By
Philip F. Larner
Atty.

(No Model.) 2 Sheets—Sheet 2.

W. G. BRISTOW.
CHILD'S SEAT FOR BICYCLES.

No. 558,010. Patented Apr. 7, 1896.

Witnesses:
J. F. Coleman
Noble D. Larner

Inventor
William George Bristow
By Philip F. Larner
Atty.

UNITED STATES PATENT OFFICE.

WILLIAM GEORGE BRISTOW, OF MEDICINE LODGE, KANSAS.

CHILD'S SEAT FOR BICYCLES.

SPECIFICATION forming part of Letters Patent No. 558,010, dated April 7, 1896.

Application filed June 22, 1895. Serial No. 553,701. (No model.)

*To all whom it may concern:*

Be it known that I, WILLIAM GEORGE BRISTOW, a citizen of the United States, residing at Medicine Lodge, in the county of Barber and State of Kansas, have invented certain new and useful Improvements in a Child's Seat for Bicycles, &c.; and I do hereby declare the following to be a full, clear, and exact description of the invention, such as will enable others skilled in the art to which it appertains to make and use the same.

Seats especially designed for attachment to bicycles, tricycles, &c., for the use of children, as heretofore manufactured and sold, have in almost all instances, as far as my knowledge extends, been of a more or less complicated and expensive character in construction, involving considerable objectionable weight to be added to the bicycle when in actual use thereon and also presenting a somewhat unattractive appearance. In some instances, by reason of the peculiar character of fastening devices, such as thumb-screws, &c., employed to securely and rigidly mount the child's seat upon the bicycle-frame, the latter is liable to more or less damage by bruising or otherwise. Such fastening devices are, moreover, frequently of a character which prevents their speedy and easy attachment to and removal from the bicycle-frame.

The object of my invention is to produce a child's seat for bicycles, &c., which shall be of a simple and inexpensive character in construction and provided with means for quick and easy attachment to and removal from the bicycle-frame, and which when in use will also impart to the rider a greater degree of comfort than is acquired in such child's seats as are held in position on the bicycle-frame by rigid fastenings.

To this end my invention, briefly stated, consists, mainly, in a child's bicycle-seat provided with a spring-base adapted to be quickly mounted upon and clasp the top bar of a bicycle with a yielding pressure at any desired point thereon, and capable of ready removal therefrom, the seat-body and base being so combined that the seat can be mounted in close relation to the bicycle-bar. To prevent objectionable backward slipping of the seat upon the bar during the use of the seat by a child, I also employ retaining straps or ties attached to the front edge of the seat at any desired point and designed to be connected with the steering head and bar of the bicycle, as hereinafter shown and described.

Figure 7:
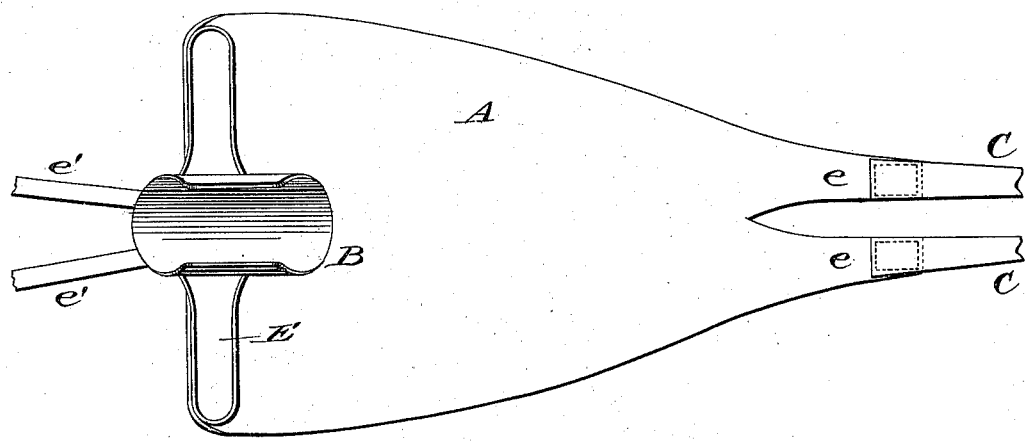

Referring to the drawings, of which there are two sheets, Figure 1, Sheet 1, represents in side view a portion of a bicycle-frame with one of my novel seats in position thereon as when in use. Fig. 2, Sheet 1, is a cross-sectional view of the seat on the line $x$, Fig. 4. Fig. 3, Sheet 1, is a longitudinal section on line $y$, Fig. 4. Fig. 4, Sheet 1, is a bottom view of the seat; and Fig. 5, Sheet 1, represents in side and end views a modified form of the spring-base. Figs. 6 and 7, Sheet 2, are bottom views of modifications of my novel seat; and Figs. 8 and 9, Sheet 2, are top views of additional modifications of my invention.

A represents the body or main portion of the seat, which, as shown on Sheet 1, is of the general saddle form commonly employed on bicycles and tricycles. This seat-body or saddle may be made in any of the various well-known forms and covered with leather or other desired material; but in this instance I have shown the saddles constructed of such metal as may be suitable for the purpose and pressed into the proper shape.

Attached to the under side of the seat-body or saddle is a base B, which is here shown secured longitudinally to the seat by soldering or otherwise and affords a ready means for the attachment of the seat to the top bar of a bicycle-frame. This base is preferably constructed of sheet spring-steel and is of a curved or partially-circular shape in general outline, forming two jaws $a$ $a$. The base should ordinarily be made with an interior space about one inch in diameter, and owing to the character of the metal of which it is composed it can readily be pressed together by the hand or in a vise, so that it can be sprung over and loosely clasp a top bar of a smaller diameter. I consider it desirable, also, to line the interior of the spring-base, as at $b$, with thin leather, felt, rubber, or other suitable soft or smooth material, properly attached to the metal, which will serve as a means for preventing any possible damage to the top bar of the bicycle by reason of the contact therewith while in use or in the attachment to or adjustment of the seat and base upon the bar. It is not, however, intended that the base should seize the bar with great firmness, as it has been found in practice that but comparatively slight and yielding pressure is necessary to retain the seat in position when not in actual use. Moreover, the absence of a fixed or rigid fastening of the base to the bar permits of a sidewise or rocking movement of the seat, which adds to the comfort of the rider.

The spring-base, as shown, is made in one piece of sheet spring-steel; but it is obvious that the base may be formed of two pieces of the spring metal of suitable form and connected at their inner edges, and it is also evident that the base may be made of strips of spring metal in skeleton form of sufficient strength and having the proper contour.

In Fig. 5 I have shown a modified form of the spring-base in which a portion of the metal is removed from the sides and ends of the base, so as to form the tongues $c$ $c$, which when in use with a seat can be readily compressed to clasp the bar of the bicycle. A base of this form I consider quite desirable and effective.

As shown in Figs. 3 and 4, the rear of the saddle is elevated and supported by a suitable brace $d$, resting upon the top of the base B, while the forward end of the saddle is extended slightly beyond the end of the base and gradually contracted in width and curved to conform to and partially surround the upper surface of the base and also the top bar of the bicycle when mounted thereon. This in effect extends the length of the seat a few inches, permitting a child to move slightly forward on the bar and back into the seat without discomfort, and in bicycles wherein low handle-bars are employed it is advisable to have the seat fit closely to the top bar.

When the seat is mounted upon the top bar and located at the proper position thereon most convenient for the child and the operator of the bicycle, it is essential that means be provided for preventing the backward movement of the seat and its base upon the bar. I therefore employ retaining straps or ties C C, which may be of any suitable material, although, preferably, they are made of thin narrow strips of leather and attached to the saddle at its front end. After the seat has been placed in position the free ends of the straps or ties are passed under the bar and crossed, and then passed around the steering-head over the bar, again around the head and tied, by which means the straps will be held in position without slipping and retain the seat and base against backward movement. A suitable buckle attached to the end of one of the straps may be used as a means for uniting the outer ends of the two straps.

Usually when in position upon the seat a small child's feet will rest upon the steering-fork, and the feet of a larger child will rest upon the coasters, while the seat is held in a correct upright position by the weight of the child.

In Figs. 2, 3, and 4 of the drawings I have shown in full size a child's seat which has been practically and satisfactorily tested by children of from three to eight years of age.

On Sheet 2 of the drawings I have shown several views of modifications of my novel seat, illustrating some of numerous variations to which the main feature of my invention is applicable, and which are more particularly designed for seats of very light weight.

In Fig. 6 is illustrated a seat in which the body or saddle A is made of leather of suitable shape supported at the rear upon and attached to a short metal frame or plate D, which is curved at its rear to correspond with the leather of the saddle, then downwardly extended, and resting upon the spring-base B, constructed as hereinbefore described, and supported by the brace $d$. At its front end the leather saddle is contracted in width and provided with tongues $e$ $e$, which add to the ease and comfort of the seat, and to these tongues are attached the retaining-straps C C.

In Fig. 7 is shown another seat, in which the leather saddle is substantially similar to that shown in Fig. 6, but is mounted at its rear upon a smaller narrow curved metal frame or support E, extending across and under the end of the leather, and this frame or support E is directly attached to the spring-metal base B without the intervening brace. This clamp, owing to the narrow construction of the frame or support E, is of a somewhat shorter length than those previously illustrated, and as in the use of this seat there may possibly be a tendency toward a longitudinal forward movement of the seat a suitable strap, of rubber or other material, as at $e'$, may be attached to the rear of the seat and connected with the bicycle-frame, which will maintain the seat in proper position and also keep the leather tightly stretched.

Figure 8:
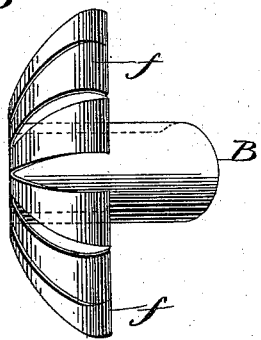

In Fig. 8 is shown a spring-base in which there is formed at one end of the base B and integrally therewith a series of upwardly and inwardly curved tongues $f$, to which is attached the rear end of the leather body of the seat, and which, by reason of the peculiar construction shown, serve as a spring-support therefor.

Figure 9:
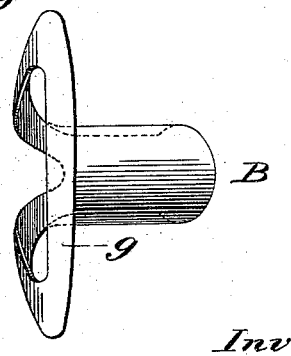

In Fig. 9 there is shown still another form of base having a support $g$ for the rear end of the leather seat-body, and which is also made integral with the spring metal of the base B, bent upwardly and inwardly, and affords a spring-support for the seat-body. This support may, however, be adapted to act as a rigid brace for the seat.

A child's seat for bicycles, &c., constructed as herein described and shown, is quite inexpensive in construction and can be quickly and easily mounted upon and removed from the bicycle-bar. The use of such a seat adds but little to the weight of the bicycle, while its appearance is in no manner unsightly.

Having thus described my invention, I claim as new and desire to secure by Letters Patent—

1. A child's seat for bicycles, &c., consisting of a seat portion, and a spring-base attached thereto beneath the same, and adapted to partially surround and loosely clasp the bar of a bicycle-frame, and maintain the seat in close relation to said bar and practically in the same horizontal plane therewith, substantially as described.

2. In a child's seat for bicycles &c., the combination of a seat-body and a spring-base fastened to the under side thereof, the said seat-body having its front end curved to conform to and partially surround the upper surface of said base and the top of a bicycle-bar, when mounted thereon, substantially as described.

3. In a child's seat for bicycles, &c., the combination with the seat-body, and its base adapted to be readily mounted upon and loosely embrace the bar of a bicycle-frame, of retaining straps or ties attached to the seat and connecting the same with the frame of the bicycle to maintain the seat in position upon the bar, and prevent backward movement thereof while in use by a child, substantially as described.

In testimony whereof I affix my signature in presence of two witnesses.

WILLIAM GEORGE BRISTOW.

Witnesses:
F. P. CHAPIN,
J. S. RUNYAN.